United States Patent [19]

Brandoli

[11] Patent Number: 4,685,734
[45] Date of Patent: Aug. 11, 1987

[54] ENVELOPE FOR HOUSING AND FIXING AN ADJUSTMENT ROD ADJUSTING THE POSITION OF A MOTORCAR SEAT

[75] Inventor: Luigi Brandoli, Cascine Vica-Rivoli, Italy

[73] Assignee: ELCAT Direzione Sviluppo S.p.A., Turin, Italy

[21] Appl. No.: 800,045

[22] Filed: Nov. 20, 1985

[30] Foreign Application Priority Data

Nov. 23, 1984 [IT] Italy ................... 54074[U]

[51] Int. Cl.⁴ ............................................. A47C 1/027
[52] U.S. Cl. ...................................... 297/355; 297/375
[58] Field of Search ................. 297/355, 378, 375; 29/463

[56] References Cited

U.S. PATENT DOCUMENTS 2,675,861  4/1954  Cushman ........................... 297/375
3,356,411  12/1967  Homier et al. ..................... 297/355
3,398,986  8/1968  Homier .............................. 297/355
3,528,532  9/1970  Moskow ......................... 297/355 X
4,552,405  11/1985  Wiers ................................ 297/375

Primary Examiner—Peter A. Aschenbrenner
Attorney, Agent, or Firm—Oblon, Fisher, Spivak, McClelland, & Maier

[57] ABSTRACT

An envelope for a rod serving to lock the position of a motorcar seat is formed by two half shells made of stamped plate and separate from one another. For one end of the half shells there are provided means for the mutual coupling and engagement of the rod on the stationary part of the seat. On the wall of one of the half shells a protuberance containing an attachment hole is provided. The attachment hole allows fixing a cable to respective control tab which, in its turn, operatively swings into a suitable cavity formed on the other half shell.

9 Claims, 5 Drawing Figures

Fig. 1
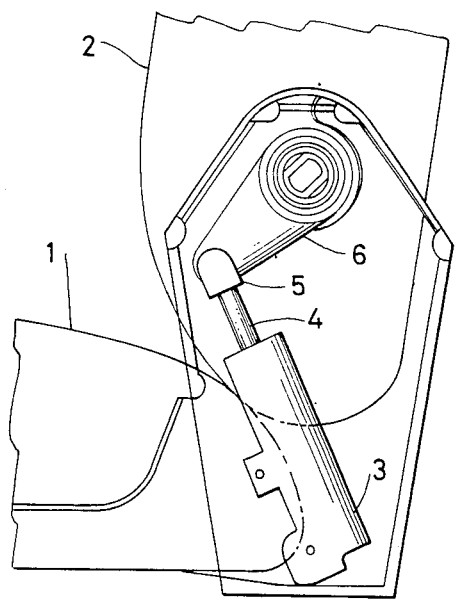
Fig. 3
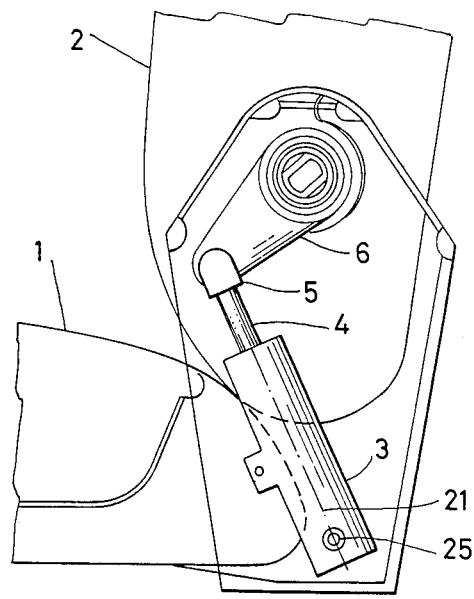
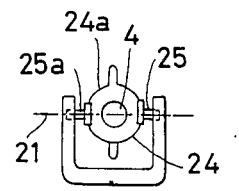
Fig. 5

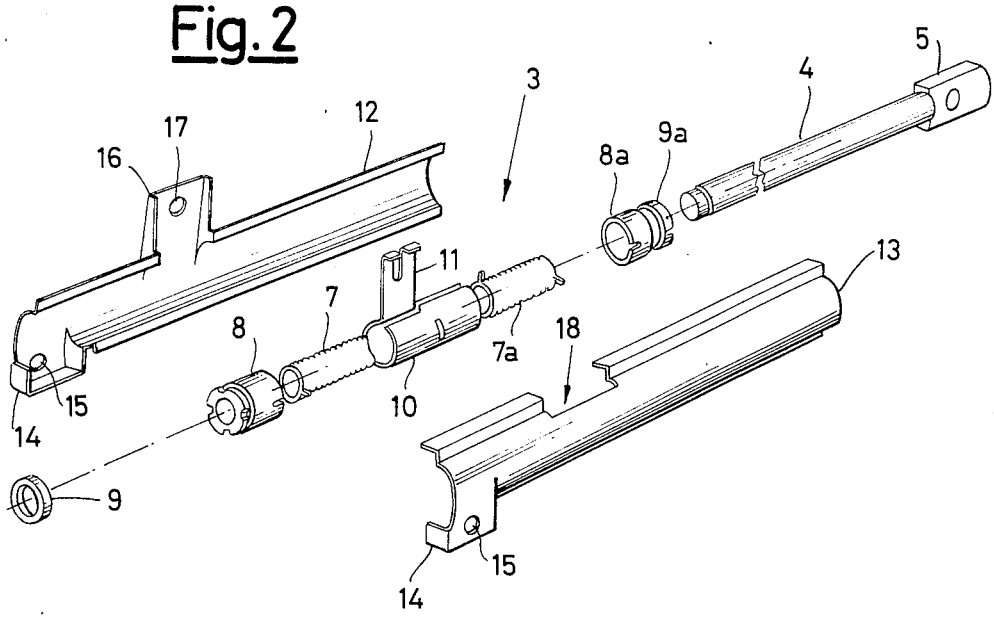
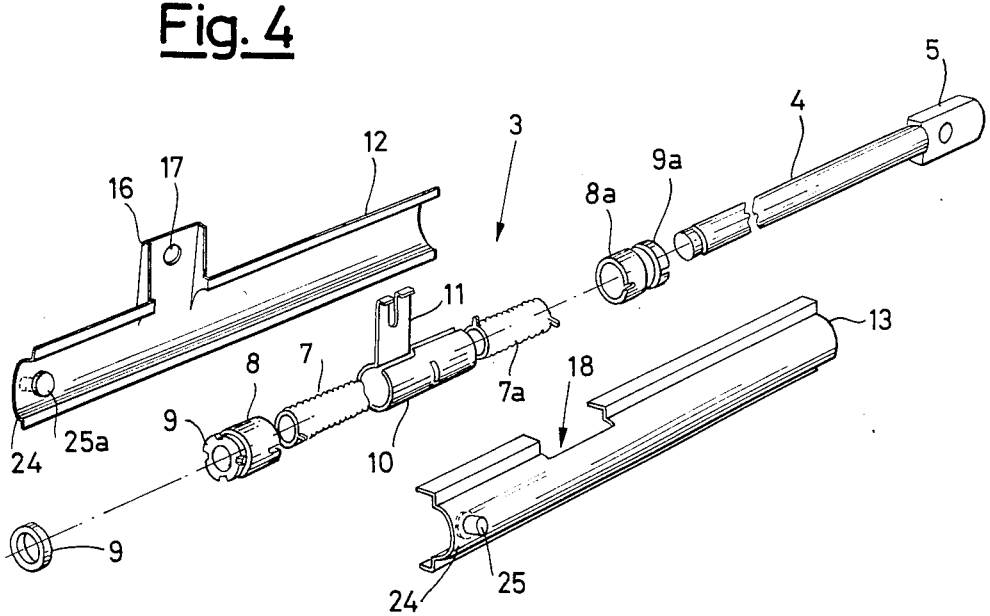

ENVELOPE FOR HOUSING AND FIXING AN ADJUSTMENT ROD ADJUSTING THE POSITION OF A MOTORCAR SEAT

FIELD OF THE INVENTION

This invention relates to a particular configuration of the stamped plate envelope intended to contain therein the locking rod acting to positionally adjust the fundamental parts of a motorcar seat.

Conventionally, a rod cooperating with means formed substantially by springs, bushings, and striking tabs for the respective control is lodged in a tubular metal envelope. The continuous profile of the tubular metal envelope however, gives rise to various difficulties in assembling the components.

In fact, as there are two springs, and as each of the springs is coupled to its respective bushing with a ring nut, preliminary separate positioning operations of these members are necessary. In addition the rod has to be disposed in a striking position against the striking tab. Moreover, all these preassembly operations having to be carried out separately of the working bench. The whole assembly is then completed and connected to the cable with which the seat is operated. This procedure generates constructional difficulties and a poor visualization of the assembly process, owing mainly to the presence of the tubular enbelope. Moreover, the assembly process requires long and partly idle working times, due to the necessity of preliminarily positioning the various members of the device. Finally, the procedure has to be carried out by skilled personnel, thus creating also an economical disadvantage.

OBJECT OF THE INVENTION

The object of the invention is to obviate the drawbacks described above by means of a new technical solution in which a non-tubular envelope is substituted for the conventional tubular envelope. The non-tubular envelope is formed from parts which originally are separate from one another. This permits an easy and rapid preassembly of the components of the device with an ample and comfortable visualization possibility for the operators. Moreover, the operator may also not be highly skilled. Accordingly, the invention makes it possible to obtain a high mass-production with a certain degree of automation and with considerably reduced costs at the manufacturing source.

SUMMARY OF THE INVENTION

The invention provides an envelope for a motorcar seat position locking the fundamental characteristic of which consists in the fact that the envelope is formed from two separate half shells of stamped plate on the ends of which there are directly formed the hole for the passage of the means for locking the rod device to the stationary part of the seat. On one of the half shells a protuberance or lateral tang is formed which, with the associated hole, provides for the fixing of the cable to the respective control tab which operatively swings into the appropriate cavity formed on the other half shell.

BRIEF DESCRIPTION OF THE DRAWINGS

Two preferred technical embodiments of the invention, described by way of non limiting example, will now be described with reference to the annexed drawings, in which:

FIG. 1 is a diagrammatic and partial side view of a motorcar seat provided with a first embodiment of the invention;

FIG. 2 is an enlarged exploded view of the components of the rod shown in FIG. 1;

FIG. 3 is a view similar to that of FIG. 1 of a second embodiment of the invention;

FIG. 4 is a view similar to that of FIG. 2, but referring to the embodiment shown in FIG. 3; and FIG. 5 is a front view of a detail of the assembly shown in FIG. 4.

DETAILED DESCRIPTION OF THE PRESENTLY PREFERRED EMBODIMENTS

Referring first to the embodiment shown in FIGS. 1 and 2 and limiting the description to the truly inventive members of the device according to the present invention, reference number 1 indicates the cushion of a motorcar seat. A seat back 2 is engaged on the rear end of the cushion 1. The required and comfortable swinging movement of the seat back 2 is regulated and locked by cooperation with a rod device according to the invention indicated generally by reference number 3.

More specifically, the rod device 3 includes a cylindrical rod 4 provided at a free end thereof with a profiled appendix 5. The profiled appendix 5 is connected to a bracket 6 serving to directly actuate the oscillation of the seat back 2. Directionally aligned with the cylindrical rod 4 in axially opposite positions are elastic means formed by two helical springs indicated by reference numerals 7 and 7a. Each of the helical springs 7 and 7a is functionally adjacent to a corresponding bushing 8 or 8a. Each of the bushings 8 and 8a is provided with a corresponding locking nut 9, 9a.

Interposed between the helical springs 7 and 7a is a cylindrical bracket 10 which directly incorporates a control tab 11.

According to the specific inventive characteristic, the components described above are housed within an outer envelope formed by two half shells 12 and 13. The half shells 12 and 13 are made of sturdy and thick stamped plate of suitable shape. Each half shell 12, 13 has a bent end 14. Formed in each bent end 14 is a hole 15 sized, shaped, and positioned to allow the passage of locking members (not shown) serving to lock the rod device 3 to the stationary part of the seat. On the half shell 12 there is formed a vertical tang 16 containing a hole 17 sized, shaped, and positioned to allow locking a control cable (not shown) to the control tab 11.

The control tab 11 operatively swings from the vertical tang 16, which is dimensioned in accordance with the configurations of the central tab 11, till it reaches a cavity 18 formed in the half shell 13.

From the configuration described hereinabove, it is clear that as a result of the simple contrivance consisting in forming the envelope from the half shells 12 and 13, a useful preassembly of the parts may be carried out. This preassembly comprises also the integral provision of the hole 15 and the vertical tang 16 containing the hole 17. The whole working process can be carried out rapidly and easily thanks to the new technical solution, which replaces the conventional integral tubular envelope with an envelope formed from the half shells 12 and 13.

The misalignment of the holes 15, described hereinabove, relative to the cylindrical rod 4 may generate during the sliding of the cylindrical rod 4 anomalous mechanical stresses which uselessly affect the functionality and give rise also to a premature wear of the components, according to the type of application of the rod.

The object of the embodiment shown in FIGS. 3, 4, and 5 is to obviate these disadvantages by eliminating the misalignment mentioned hereinabove by means of a technical solution which provides for an axial alignment of the locking members with the cylindrical rod 4. In this embodiment, the locking members are formed directly in the envelope. Because of this, the cylindrical rod 4 is capable of positively exhibiting a more correct functionality.

With reference to FIGS. 3, 4, and 5, in which parts that are the same as those shown in FIGS. 1 and 2 are indicated by the same reference numerals, it can be observed that the half shells 12 and 13 have ends 24 and 24a, respectively, and that a pin 25 is mounted on the end 24 and a pin 25a is mounted on the end 24a. The pins 25 and 25a may be welded on the half shells 12 and 13 or formed directly by upsetting. The pins 25 and 25a are capable of carrying out the locking of the rod device 3 as a whole to the stationary part of the motorcar seat.

From the structure described hereinabove, in particular from the graphical representation shown in FIG. 5, it is possible to observe the positioning of the pair of pins 25 and 25a aligned with one another and also with the cylindrical rod 4 along a common orthogonal axis 21, the whole being capable of providing a more efficient and correct operation of the cylindrical rod 4 itself.

I claim:

1. An envelope for a rod device for locking the position of a motorcar seat, said envelope comprising:
   (a) a first generally cylindrical half shell comprising:
      (i) a first body sized and shaped to envelope one side of a rod device for locking the position of a motorcar seat, said first body extending parallel to the axis of the rod device;
      (ii) a bent end extending from one end of said first body at least substantially perpendicularly to the axis of the rod device and containing a first hole sized, shaped, and positioned to allow the passage of a locking member which, in use, serves to lock the rod device to the motorcar seat; and
      (iii) a tang extending from the central portion of said first body at least substantially perpendicularly to the axis of the rod device and containing a second hole sized, shaped, and positioned to allow the locking of a control cable to a control tab on the rod device, and
   (b) a second generally cylindrical half shell comprising:
      (i) a second body sized and shaped to envelope the other side of the rod device and to mate with said first body, said second body extending parallel to the axis of the rod device;
      (ii) a bent end extending from one end of said second body at least substantially perpendicularly to the axis of the rod device and containing a third hole sized, shaped, and positioned to allow the passage of a locking member which, in use, serves to lock the rod device to the motorcar seat; and
      (iii) a cavity extending circumferentially from an edge of said second body at the central portion thereof, said cavity being sized, shaped, and positioned to allow the control tab on the rod device to protrude therethrough.

2. An envelope as recited in claim 1 wherein said first and second half shells are made of stamped plate.

3. An envelope as recited in claim 1 wherein said first hole in said bent end of said first generally cylindrical half shell and said third hole in said bent end of said second generally cylindrical half shell are coaxial.

4. An envelope for a rod device for locking the position of a motorcar seat, said envelope comprising:
   (a) a first generally cylindrical half shell comprising:
      (i) a first body sized and shaped to envelope one side of a rod device for locking the position of a motorcar seat, said first body extending parallel to the axis of the rod device;
      (ii) a first pin protruding from the exterior surface of said first body adjacent one end thereof at least substantially perpendicularly to the axis of the rod device; and
      (iii) a tang extending from the central portion of said first body at least substantially perpendicularly to the axis of the rod device and containing a hole sized, shaped, and positioned to allow the locking of a control cable to a control tab on the rod device, and
   (b) a second generally cylindrical half shell comprising:
      (i) a second body sized and shaped to envelope the other side of a rod device and to mate with said first body, said second body extending parallel to the axis of the rod device;
      (ii) a second pin protruding from the exterior surface of said second body adjacent one end thereof at least substantially perpendicularly to the axis of the rod device; and
      (iii) a cavity extending circumferentially from an edge of said second body at the central portion thereof, said cavity being sized, shaped, and positioned to allow the control tab on the rod device to protrude therethrough.

5. An envelope as recited in claim 4 wherein said first and second half shells are made of stamped plate.

6. An envelope as recited in claim 4 wherein said first and second pins are coaxial.

7. An envelope as recited in claim 6 wherein the axes of said first and second pins intersect and are perpendicular to the axis of the rod device.

8. An envelope as recited in claim 4 wherein said first and second pins are welded to said first and second bodies, respectively.

9. An envelope as recited in claim 4 wherein said first and second pins are integral with said first and second bodies, respectively.

* * * * *